US007783733B1

(12) United States Patent
Yip et al.

(10) Patent No.: US 7,783,733 B1
(45) Date of Patent: Aug. 24, 2010

(54) METHOD AND APPARATUS FOR DYNAMIC CONFIGURATION MANAGEMENT (75) Inventors: Michael Yip, Sunnyvale, CA (US); Yeeping Chen Zhong, Milpitas, CA (US); Qi Cao, Diamond Bar, CA (US); Anna Berenberg, Los Altos, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1017 days.

(21) Appl. No.: 10/132,946

(22) Filed: Apr. 26, 2002

(51) Int. Cl.
G06F 15/173 (2006.01)
(52) U.S. Cl. .................. 709/223; 709/220; 709/250
(58) Field of Classification Search ................ 709/223, 709/220, 230, 250
See application file for complete search history.

(56) References Cited

U.S. PATENT DOCUMENTS

| 4,403,303 | A | 9/1983 | Howes et al. |
|---|---|---|---|
| 5,548,228 | A | 8/1996 | Madurawe |
| 5,671,355 | A | 9/1997 | Collins |
| 5,961,595 | A | 10/1999 | Kawagoe et al. |
| 6,272,580 | B1 * | 8/2001 | Stevens et al. .............. 710/116 |
| 6,282,640 | B1 | 8/2001 | Klein |
| 6,463,528 | B1 | 10/2002 | Rajakarunanayake et al. |
| 6,539,422 | B1 * | 3/2003 | Hunt et al. .................. 709/217 |
| 6,546,419 | B1 | 4/2003 | Humpleman et al. |
| 6,675,259 | B2 * | 1/2004 | Gordon et al. .............. 711/114 |
| 6,760,761 | B1 | 7/2004 | Sciacca |
| 6,892,230 | B1 | 5/2005 | Gu et al. |
| 6,934,853 | B2 | 8/2005 | Christopherson et al. |
| 6,938,079 | B1 | 8/2005 | Anderson et al. |
| 6,944,759 | B1 | 9/2005 | Crisan |
| 7,031,941 | B2 | 4/2006 | Garrow et al. |
| 7,032,014 | B2 | 4/2006 | Thiyagarajan et al. |
| 7,047,292 | B1 * | 5/2006 | Stewart et al. .............. 709/224 |
| 7,054,924 | B1 | 5/2006 | Harvey et al. |
| 7,065,562 | B2 | 6/2006 | Courtney |
| 7,130,895 | B2 | 10/2006 | Zintel et al. |
| 7,131,066 | B1 | 10/2006 | Birsan et al. |
| 7,200,548 | B2 | 4/2007 | Courtney |
| 7,213,139 | B2 | 5/2007 | Zhang |

(Continued)

FOREIGN PATENT DOCUMENTS

EP 1085395 3/2001

(Continued)

OTHER PUBLICATIONS

Landru et al.; Modular Open Network Agent for Control Operations; 1998 IEEE, pp. 600-609.

(Continued)

Primary Examiner—John Follansbee
Assistant Examiner—Nghi V Tran
(74) Attorney, Agent, or Firm—Blakely, Sokoloff, Taylor & Zafman (57) ABSTRACT A method is provided to dynamically manage the configuration of a network device. An application supporting a protocol, network interface or other component of the configuration operates in conjunction with a master agent and subagent to send and receive configuration management information. The application further operates in conjunction with a configuration manager interface and configuration manager to access and update the configuration in accordance with a priority of the application, and without taking the network device out of service.

18 Claims, 9 Drawing Sheets

U.S. PATENT DOCUMENTS

| | | | |
|---|---|---|---|
| 7,266,084 | B2 | 9/2007 | Suonsivu et al. |
| 7,689,678 | B2 | 3/2010 | Yip et al. |
| 2001/0027442 | A1 | 10/2001 | Krahn et al. |
| 2002/0029276 | A1 | 3/2002 | Bendinelli et al. |
| 2002/0035621 | A1 | 3/2002 | Zintel et al. |
| 2002/0099972 | A1* | 7/2002 | Walsh et al. ................ 714/10 |
| 2002/0161883 | A1* | 10/2002 | Matheny et al. ............. 709/224 |
| 2002/0169858 | A1 | 11/2002 | Bellinger et al. |
| 2003/0006995 | A1 | 1/2003 | Smith et al. |
| 2003/0009550 | A1* | 1/2003 | Taylor et al. ................ 709/224 |
| 2003/0023707 | A1 | 1/2003 | Ryan |
| 2003/0069956 | A1* | 4/2003 | Gieseke et al. .............. 709/223 |
| 2003/0074436 | A1* | 4/2003 | Gieseke ....................... 709/223 |
| 2003/0115299 | A1* | 6/2003 | Froyd et al. ................. 709/220 |
| 2006/0155833 | A1 | 7/2006 | Matsuda et al. |
| 2006/0190575 | A1 | 8/2006 | Harvey et al. |

FOREIGN PATENT DOCUMENTS

| | | |
|---|---|---|
| JP | 11252076 | 9/1999 |
| JP | 2000-090028 | 3/2000 |
| JP | 2000122952 | 4/2000 |
| JP | 2001-148706 | 5/2001 |
| JP | 200257668 | 2/2002 |
| WO | WO 01/75634 A1 | 11/2001 |

OTHER PUBLICATIONS

Feridun et al.; Distributed Management with Mobile Components; IBM Research Report, Feb. 1999, pp. 857-870; XP002158233.

Design for a Simple Network Management Protocol Subagent for Internet Firewells, IBM Technical Disclosure Bulletin, vol. 40. No. 3, Mar. 1997, pp. 63-68; XP000694517.

Notice of Reasons for Refusal from Japanese Patent Application No. 2003-119528, mailed Apr. 22, 2008, 3 pgs.

System Operation and Management; SunWorld, vol. 10, No. 11, pp. 76-79, Nov. 1, 2000, Kabushiki Kaisha IDG Japan.

Translation of Notice of the Reason for Refusal mailed Jul. 31, 2008 (received Aug. 5, 2008) for Japanese Patent Application No. 2003-119523.

Non-Final Office Action mailed Aug. 13, 2008 for U.S. Appl. No. 10/133,163.

Final Office Action for U.S. Appl. No. 10/133,163, mailed Feb. 18, 2009, 26 pgs.

Office Action for U.S. App. No. 10/133,163, mailed Jan. 25, 2008, 10 pgs.

Final Office Action for U.S. Appl. No. 10/133,163, mailed Jun. 19, 2007, 20 pgs.

Office Action for U.S. Appl. No. 10/133,163, mailed Feb. 16, 2007, 13 pgs.

Final Office Action for U.S. Appl. No. 10/133,163, mailed Oct. 13, 2006, 14 pgs.

Office Action for U.S. Appl. No. 10/133,163, mailed Apr. 13, 2006, 10 pgs.

Final Office Action for U.S. Appl. No. 10/133,163, mailed Oct. 21, 2005, 14 pgs.

Office Action for U.S. Appl. No. 10/133,163, mailed May 31, 2005, 11 pgs.

Notice of Allowance for U.S. Appl. No. 10/133,163, Mailed Dec. 29, 2009, 18 pages.

European Search Report for EP Application No. 03291019.2, mailed Jan. 8, 2010, 3 pages.

Notice of Allowance for U.S. Appl. No. 10/133,163, Mailed Dec. 29, 2009, 18 pages.

* cited by examiner

METHOD AND APPARATUS FOR DYNAMIC CONFIGURATION MANAGEMENT

TECHNICAL FIELD

The present invention relates to the field of network management. In particular, the present invention relates to dynamic configuration of a network device.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2002, Extreme Networks, Inc., All Rights Reserved.

BACKGROUND AND RELATED ART

The architecture of high-performance Internet routers has advanced in the last several years to provide increased performance in routing ever-greater volumes of network traffic. It is not uncommon for a router to support numerous protocols as well as several control applications for configuration and maintenance of the router tables, protocols, and network policies. These advances have increased the complexity of the router such that the efficient management of the router's configuration is critical for reliable network performance.

The configuration of a router is typically managed by a centralized system configuration database residing on the router. The contents of the configuration database control the operation of the router, and manipulation of the contents of the configuration database are accomplished using a management interface, such as a command line interface (CLI). In a traditional router architecture, the CLI has full access to the system configuration database through a configuration manager process, and is intended to be the primary method of access for system professionals. The CLI can be used not only for configuration commands, but also for other interactive commands that control the operation of the router, e.g. commands to start up or shut down specific applications or processes.

Another commonly used management interface to the configuration of the router is the Simple Network Management Protocol (SNMP). SNMP is a protocol that governs network management and monitoring of network devices and their functions and is documented in Request For Comment (RFC) 2570, Introduction to Version 3 of the Internet-Standard Network Management Framework, authored by the Network Working Group of the Internet Engineering Task Force (IETF), and published by the Internet Society in April, 1999. Yet another more recently developed management interface to the configuration database of the router is based on the Extensible Markup Language, or XML. An XML-based network management interface typically uses XML to encode communication data that was entered by a network administrator via a graphical user interface (GUI), and provides a mechanism for transmitting the complex data that is used to manage networking devices to the configuration database.

It is not uncommon for certain applications and protocols on a router to allow access to their corresponding configuration data by all three of the above-described network management interfaces—CLI, SNMP, and XML. In fact, a network administrator could enter different CLI or SNMP commands that accomplish the identical configuration change on a given router. Maintaining the router to recognize all of the different management interface commands for all of the various applications and protocols that the router supports can be difficult, requiring numerous updates to data such as SNMP management information base (MIB) definitions, CLI command trees, or XML tags.

In existing router management technology, the logic to support the applications, protocols, and associated management interfaces are centrally managed in a single master program. This can result in a single point of failure, meaning that even if there is a problem with only one protocol or application or interface, the entire program could crash, bringing the router down with it. In addition, if the master program needs to be updated, say to accommodate a new protocol, e.g. the Multi-Protocol Label Switching (MPLS) protocol, or to accommodate a new faster blade, either of which can introduce a new set of CLI commands, SNMP requests, or XML accesses that must be supported, then the master program must be brought down in order to perform the updates, thereby temporarily taking the router out of service.

In an effort to overcome some of the limitations in existing router management technology, separate processing entities known as master agents and subagents have been developed in the context of the SNMP management framework. A master agent sends and receives the SNMP requests but has little or no access to the management information, e.g. the MIB data in the configuration database. The subagent does have access to the management information and processes the SNMP requests, but is shielded from the SNMP requests themselves. RFC 2741, Agent Extensibility (AgentX) Protocol, authored by the Network Working Group of the IETF, and published by the Internet Society in January 2000, documents the concept of extensible SNMP agents and a protocol for communication between the master agent and the subagent.

The SNMP master agent/subagent technology has provided new opportunities for improving configuration management. However, little has been done to overcome the limitations in existing router management technology in the context of other management interfaces, or to provide a comprehensive solution to configuration management regardless of management interface.

SUMMARY

According to one aspect of the invention, a method and apparatus is provided to dynamically manage the configuration of a network device. An application supporting a protocol, network interface or other component of the configuration operates in conjunction with a master agent and subagent to send and receive configuration management information. The application further operates in conjunction with a configuration manager interface and configuration manager to access and update the configuration in accordance with a priority of the application and without taking the network device out of service.

According to one aspect of the invention, the application activates the subagents, which register and deregister with the corresponding master agent as needed. The master agent and registered subagents communicate using a common messaging interface to exchange commands and configuration information sent to and from a network administrator. The application maps the commands and configuration information to a universal management object format and further activates a configuration manager interface to exchange the formatted commands and configuration information with the configuration manager using the common messaging interface.

The master agent and subagent operate independently of each other and the application, and independently of other master agents and subagents associated with the application or with other applications. The configuration manager and configuration manager interface also operate independently of each other and the application. The independent activation and operation of the subagent, master agent, application, configuration manager and configuration manager interface enables a network administrator to add or update a protocol, add or change a blade, or take other actions without having to disable the network device itself. Moreover, the failure of the configuration manager, an application or corresponding subagent, master agent, or configuration manager interface does not cause the entire network device to fail.

In accordance with these and other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for dynamic configuration management will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, packets, messages, tables, command, message information base, command trees, tags and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

It should be noted that while the description that follows addresses the method and apparatus as it applies to a network device such as a router, or layer 3 switch, it is appreciated by those of ordinary skill in the art that method is generally applicable to any packet forwarding device, including a bridge (layer 2 switch), server or gateway. It should also be noted that while the method and apparatus may be discussed in the context of a local area network (LAN), the present invention may also be used in the context of other Transport Control Protocol/Internet Protocol (TCP/IP)-based networks including, but not limited to, internetworks, Virtual Local Area Networks (VLANs), Metropolitan Area Networks (MANs), and Wide Area Networks (WANs), as well as networks organized into subnets.

Figure 1:
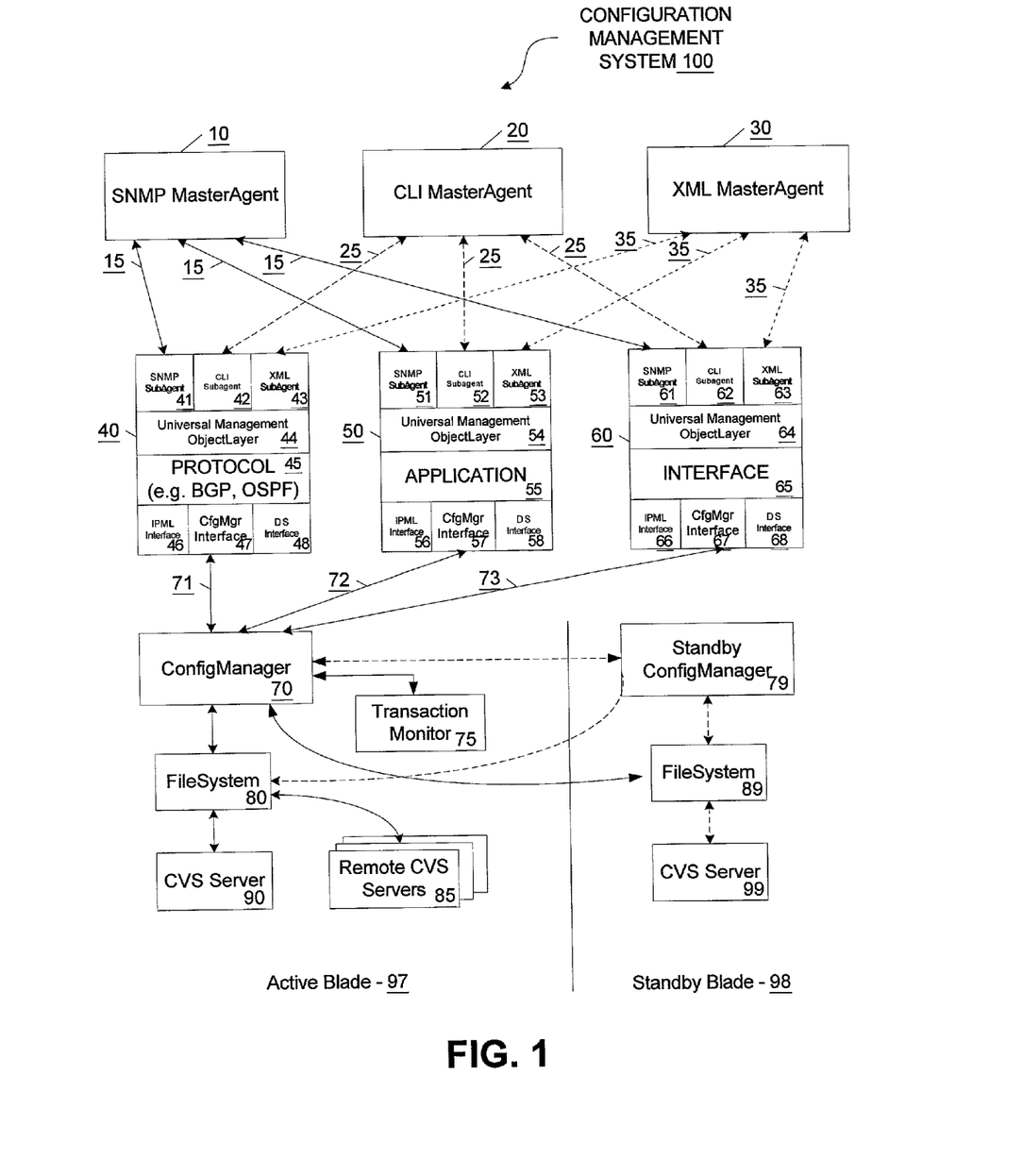
FIG. 1 is a block diagram illustrating one generalized embodiment of a configuration management system incorporating the invention, and the operating environment in which certain aspects of the illustrated invention may be practiced.

FIG. 1 is a block diagram illustrating one generalized embodiment of a router configuration management system incorporating the invention, and the operating environment in which certain aspects of the illustrated invention may be practiced. As illustrated, the configuration management system 100 operates on a router that has a configuration manager 70.

The configuration manager 70 operates in conjunction with a transaction monitor 75, file system 80, a concurrent version server (CVS) server 90, and one or more remote CVS servers 85 to maintain the router's configuration data. The configuration data include the currently running configuration, and the last saved configuration. The currently running configuration is stored in volatile memory on the router, whereas the saved configuration is stored in non-volatile memory or other permanent storage medium using the file system 80. The configuration manager 70 further maintains a particular version of the configuration data in non-volatile memory using the CVS server 90 and remote CVS servers 85 to provide version control. In one embodiment, the configuration manager 70 saves the existing versions of the configuration data at runtime in an ASCII-formatted text file using the file system 80. It should be noted that the configuration manager 70 could save the configuration data in file formats other than ASCII without departing from the scope of the invention. For example, in one embodiment, the configuration data may be saved in an XML-formatted file as described in a commonly assigned co-pending application entitled "Method and Apparatus for Restoring the Configuration of a Network Device," Ser. No. 10/133,163, which is herein incorporated by reference.

During operation, the configuration manager 70 uses the transaction monitor 75 to buffer and control multiple updates to the configuration data to preserve its integrity. The last saved version of the configuration data (or other backup version of the configuration data) is replicated on a standby blade 98 that has a standby configuration manager 79 and standby file system 89, as well as a standby CVS server 99.

A typical router supports a number of applications that support protocols, network interfaces, and other components, the operations of which are controlled in accordance with the currently running configuration as maintained by configuration manager 70. For example, in the illustrated embodiment, the router includes applications to support the Border Gateway Protocol (BGP) 40, the Open Shortest Path First protocol (OSPF) 50, and an Ethernet Interface 60.

Each application may also support one or more management interfaces, such as CLI, SNMP, or XML-based management interfaces. The management interfaces provide network administrators with access to the functions of the router and router applications using CLI commands, or SNMP or XML requests to update or access the configuration.

In one embodiment, rather than being incorporated into the application, the management interfaces to the router's functions, applications, and resulting configuration are carried out using a master agent/subagent scheme. The master agent/subagent scheme is a technique to allow a user to perform per-variable multiplexing in a dynamic fashion. For example, the scheme permits an application to activate a subagent to dynamically register leaves into a master agent's command tree, or to register other information that controls the master agent's operations. The master agent is an independent process, such as a daemon, that receives, sends, and is capable of validating the management interface input data before passing it to the subagent via a communications channel 15/25/35 using a common messaging interface. The subagent is also an independent process, such as a thread, that is generated by and directly interfaces with the application layer 40/50/60. The application layer 40/50/60 has many components, including the application itself 44/54/64, which operates in conjunction with a universal management object layer (UMOL) 44/54/64 to map the commands, requests, or messages exchanged via the master agent/subagent scheme into a common internal structure. In one embodiment the common internal structure is composed of actions and parameters.

In one embodiment, the application operates in conjunction with a configuration management interface 47/57/67 to pass the actions and parameters generated in accordance with the UMOL common internal structure to the configuration manager 70 over a communications channel 71/72/73 using the common messaging interface. The configuration manager 70 coordinates the processing of updating the configuration by periodically requesting from each registered application, the configuration data—the actions and parameters—that need to be accessed or updated. The configuration manager 70 carries out the actions in accordance with the parameters, and in accordance with an application sequencing scheme that was established at registration time. The configuration manager 70 further passes responses to the actions and parameters, if any, back to the application via the configuration management interface 47/57/67 and over the communications channel 71/72/73 using the common messaging interface.

By using the master agent to isolate the application layer's components from the management interface and the configuration manager interface to isolate the configuration manager from the application layer components, the router's configuration can be more easily managed and dynamically updated.

In the illustrated embodiment, the configuration management system 100 includes three master agents, an SNMP master agent 10, a CLI master agent 20, and an XML master agent. The configuration management system 100 further includes corresponding SNMP subagents for each application: SNMP subagent 41 for the BGP application 45, SNMP subagent 51 for OSPF application 55, and SNMP subagent 61 for the Ethernet interface application 65. Similarly, the configuration management system 100 further includes corresponding CLI subagents for each application: CLI subagent 42 for the BGP application 45, CLI subagent 52 for OSPF application 55, and CLI subagent 62 for the Ethernet interface application 65, and further includes corresponding XML subagents for each application: XML subagent 43 for the BGP application 45, XML subagent 53 for OSPF application 55, and XML subagent 63 for the Ethernet interface application 65. Each application further includes a configuration manager interface: configuration manager interface 47 for the BGP application 45, configuration manager interface 57 for the OSPF application 55, and configuration manager interface 67 for the Ethernet interface application 65. It should be noted that other types of management interfaces other than CLI, SNMP, or XML may be employed without departing from the scope of the invention.

Figure 2:
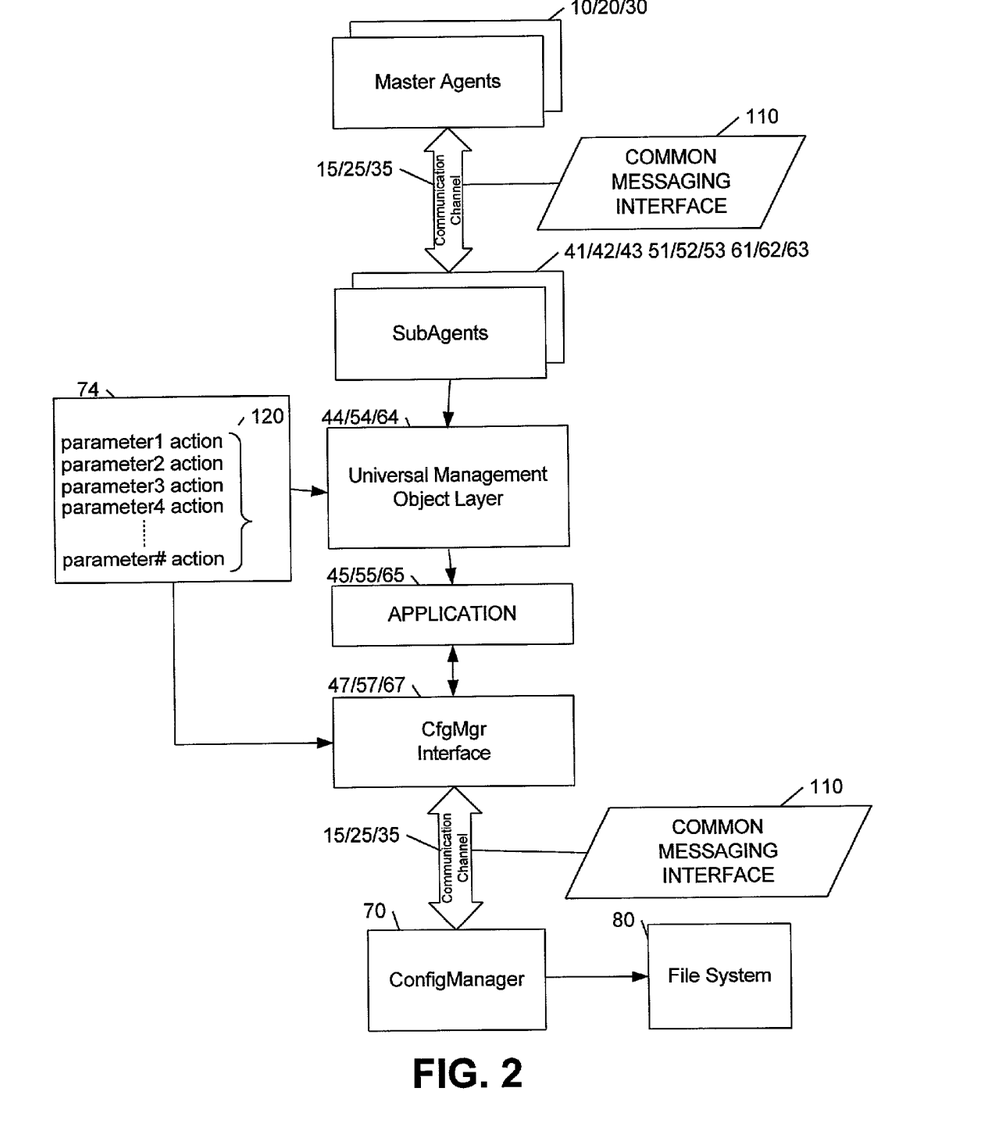
FIG. 2 is a block diagram illustrating selected components of the configuration management system of FIG. 1 in further detail, in accordance with one embodiment of the present invention.

FIG. 2 is a block diagram illustrating configuration management system 100 of FIG. 1 in further detail. In one embodiment, the master agents 10/20/30 and subagents 41/42/43/51/52/53/61/62/63 exchange configuration management information using a common messaging interface 110 and communications channel 15/25/35. A UMOL 44/54/64 interfaces with the subagents 41/42/43/51/52/53/61/62/63 and applications 45/55/65 to map the configuration management information to an internal data structure 74. The applications 45/55/65 operate in conjunction with the configuration management interfaces 47/57/67 to issue actions and parameters 110 generated in accordance with the UMOL's internal data structure 74. The configuration management interfaces 47/57/67 send the actions and parameters 110 to the configuration manager 70 using the common messaging interface 110 and communications channel 71/72/73. In one embodiment the communications channels 15/25/35 and 71/72/73 may be inter-process communication channels (IPC). However, other types of communication channels may be used, such as transmission control protocol (TCP) channels or sockets, without departing from the scope of the invention.

Figure 3:
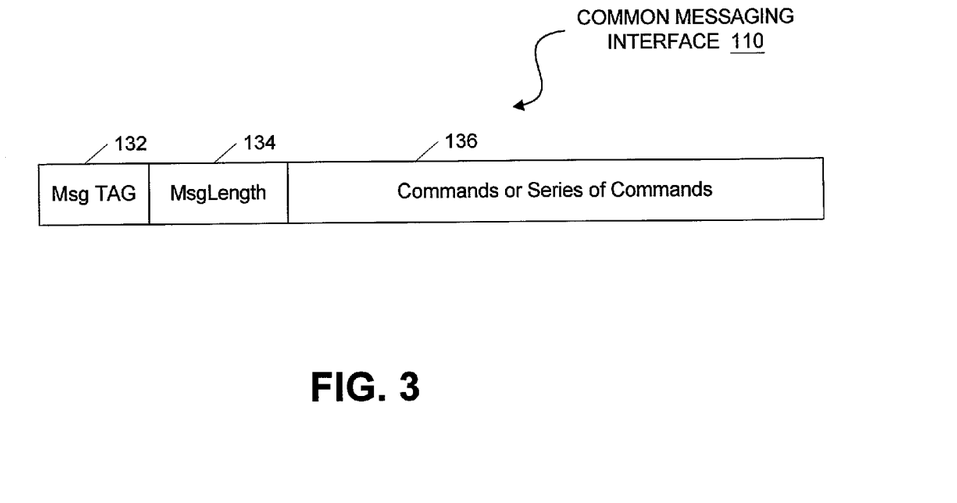
FIG. 3 is an illustration of a data format of the common messaging interface of FIG. 1, in accordance with one embodiment of the present invention.

FIG. 3 illustrates a message format 130 for the common messaging interface 110 that is used to exchange configuration information between the master agents and subagents, as well as between the configuration management interfaces 47/57/67 and the configuration manager 70. As illustrated the message format includes a message TAG 132, a message length 134 and the message content 136. The format of the message content 136 varies depending on which application the message is sent from or destined for and which management interface passed the content, e.g. CLI, SNMP, or XML. In one embodiment, the message content 136 contains a series of formatted commands as received and processed by the master agent and subagent. The expected format of the message content 136 is identified by the message TAG. Table 1 summarizes some examples of different message tags which may be used in accordance with an embodiment of the invention, and a description of their function.

TABLE 1

| Message TAG | Description |
| --- | --- |
| REGISTER_SNMP | Subagent request to register with the SNMP master agent |
| REGISTER_CLI | Subagent request to register with the CLI master agent |
| REGISTER_XML | Subagent request to register with the XML master agent |
| CLI_CMD | Master agent/subagent - CLI command and parameters |
| XML_ELEMENT | Master agent/subagent - XML element and values |
| SNMP_MIB_OID | Master agent/subagent - SNMP MIB OID table elements |
| REGISTER_CM_APP_NAME | Subagent request to register an application with the Configuration Manager |
| REGISTER_CM_APP_PRIORITY | Subagent request to register an application's priority with the Configuration Manager |
| CFG_SAVE_REQUEST | Configuration Manager's request to an application to provide configuration content for saving to the running configuration |
| CFG_SAVE_CONTENT | Application's response to the Configuration Manager's CFG_SAVE_REQUEST providing configuration content for saving to the running configuration |
| CFG_REP_CONFIG | Application's request to the Configuration Manager to replicate the configuration to the slave backup. |
| ROLLBACK | Application's request to the Configuration Manager to provide rollback support |
| ROLLBACK_NOT_SUPPORTED | Application's request to the Configuration Manager to not provide rollback support |

As can be seen in Table 1, some of the message TAGs identify messages generated by the subagent to the master agent, while other message TAG's identify messages generated by the application to the configuration manager 70 (or vice versa). For example, a message TAG of REGISTER_CLI is generated by the subagent to indicate that the message itself is a request to register with the master agent. A message TAG of CLI_CMD is generated by the master agent to indicate to the subagent that the message content 136 of the message contains a validated CLI_CMD. On the other hand a message TAG of CFG_SAVE_REQUEST is generated by the configuration manager to indicate to the application that the message is a request to the application to send whatever configuration data which needs to be saved to the last saved configuration in non-volatile memory, and the message TAG of CFG_SAVE_CONTENT is the response generated by the application to the configuration manager, indicating that the message content 136 contains the desired configuration data that needs to be saved by the configuration manager 70. Other message TAGs may include, among others, a replication request or a rollback request generated by the application to the configuration manager 70.

Figure 4A:
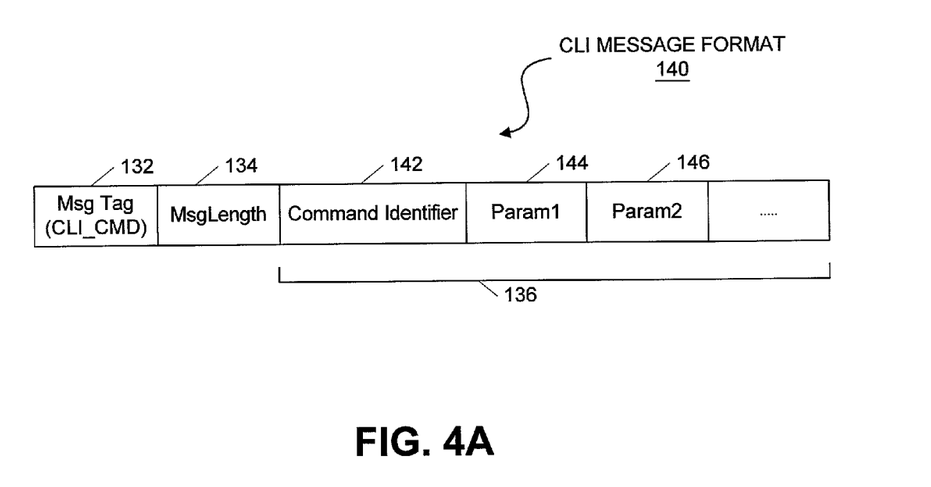
FIG. 4A is an illustration of an example of the common messaging interface of FIG. 1 for a CLI-based management interface, in accordance with one embodiment of the present invention.
Figure 4B:
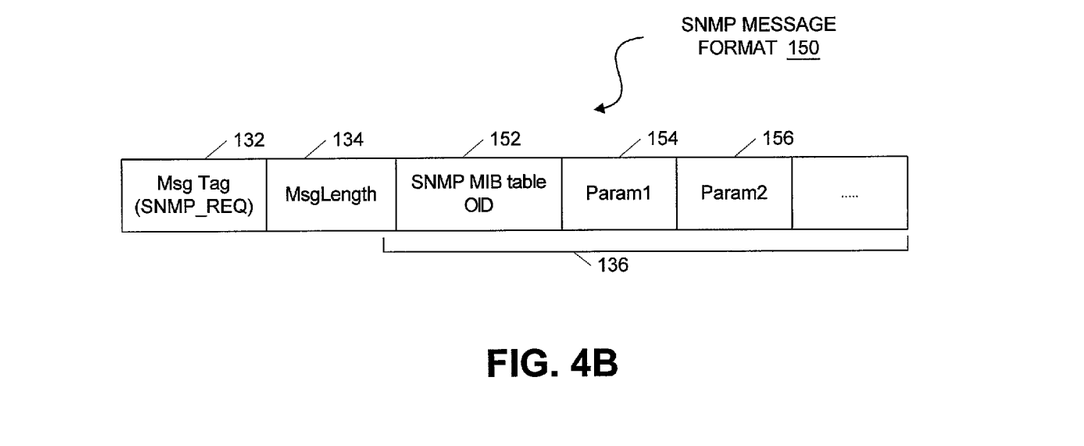
FIG. 4B is an illustration of an example of the common messaging interface of FIG. 1 for an SNMP-based management interface, in accordance with one embodiment of the present invention.
Figure 4C:
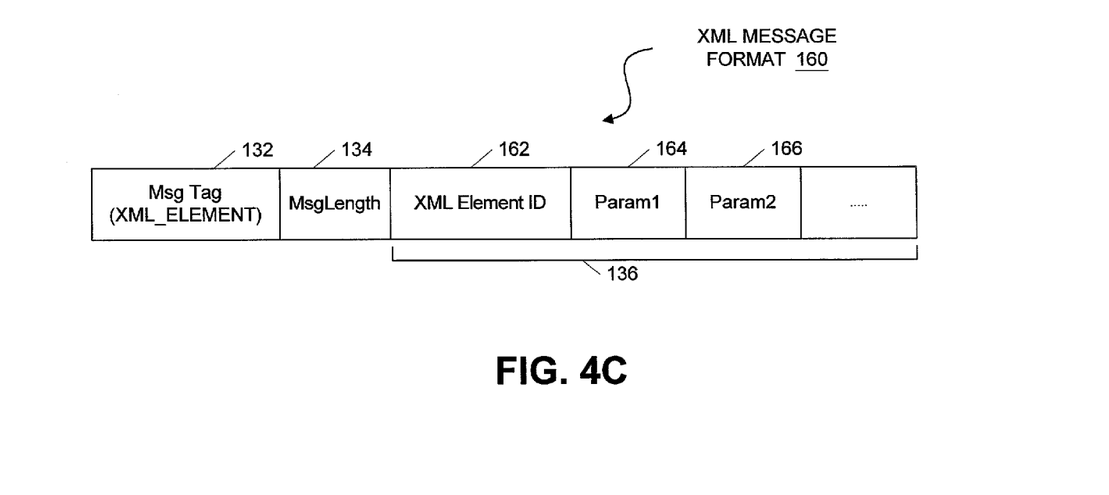
FIG. 4C is an illustration of an example of the common messaging interface of FIG. 1 for an XML-based management interface, in accordance with one embodiment of the present invention.

FIG. 4A illustrates an example of the common messaging interface 110 when used for a CLI message that is being passed from a master agent to a subagent. The CLI message format 140 includes the message tag 132 value of "CLI_CMD" indicating that the message is a CLI command. The message content 136 comprises a command identifier 142 and one or more parameters 144/146. FIG. 4B illustrates the common messaging interface 110 when used for an SNMP request that is being passed from a master agent to a subagent; likewise FIG. 4C illustrates the common messaging interface 110 when used for an XML request that is being passed from a master agent to a subagent. Numerous other message tag values 132, message lengths 134 and formats of the message content 136 may be employed in the common messaging interface 110 without departing from the scope of the invention.

Figure 5:
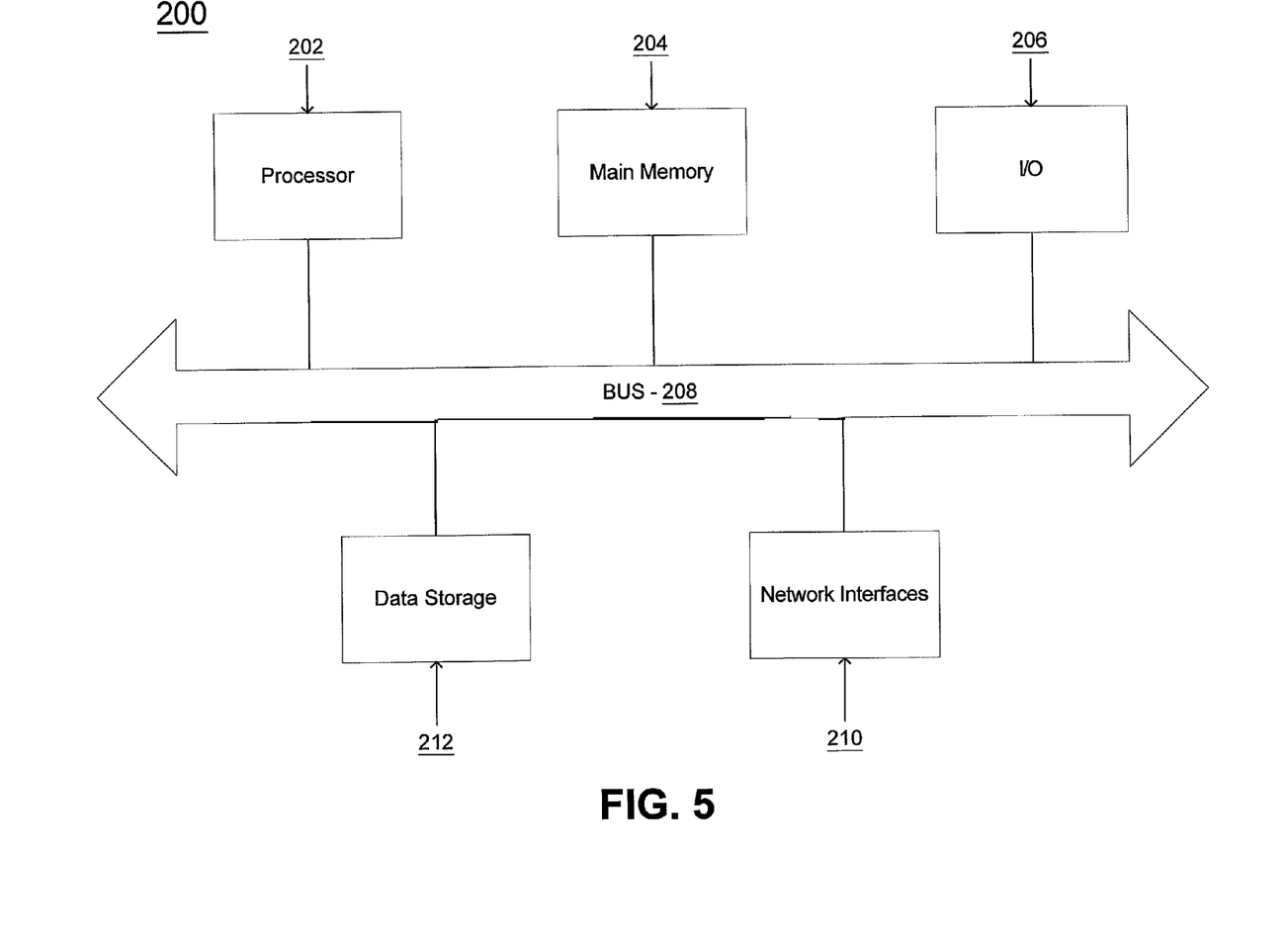
FIG. 5 is a block diagram illustrating a suitable computing environment in which certain aspects of the illustrated invention shown in FIGS. 1-4C may be practiced.

FIG. 5 illustrates one embodiment of a suitable computing environment in which certain aspects of the invention illustrated in FIGS. 1-4C may be practiced. In one embodiment, the method for a configuration management system 100 may be implemented on a computer system 200 having components 201-206, including a processor 201, a memory 202, an Input/Output device 203, a data storage 204, and a network interface 205, coupled to each other via a bus 208. The components perform their conventional functions known in the art and provide the means for implementing the configuration management system 200. Collectively, these components represent a broad category of hardware systems, including but not limited to general purpose computer systems and specialized packet forwarding devices.

In one embodiment, the memory component 202, may include one or more of random access memory (RAM), and nonvolatile storage devices (e.g., magnetic or optical disks) on which are stored instructions and data for use by processor 201, including the instructions and data that comprise the master agents 10/20/30, the configuration manager 70, as well as the configuration manager interfaces 47/57/67, and subagents 41-43, 51-53, and 61-63, and other components of the configuration management system 200.

In one embodiment, the data storage component 204 may represent the configuration file system 80 managed by the configuration management system 100, and any other storage areas such as buffers, etc., used by the protocols 45, applications 55, or other interfaces 65.

It is to be appreciated that various components of computer system 200 may be rearranged, and that certain implementations of the present invention may not require nor include all of the above components. Furthermore, additional components may be included in system 200, such as additional processors (e.g., a digital signal processor), storage devices, memories, network/communication interfaces, etc.

In the illustrated embodiment of FIG. 5, the method and apparatus for a configuration management system 100 in accordance with one embodiment of the invention may be implemented as a series of software routines executed by computer system 200. The software routines may comprise a plurality or series of instructions, code sequences, configuration information, or other data to be accessed and/or executed by a processing system such as one or more of processor 201. Initially, the series of instructions, code sequences, configuration information, or other data may be stored on a data storage 204 and transferred to memory 202 via bus 208. It is to be appreciated that the series of instructions, code sequences, configuration information, or other data can be stored a data storage 204 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 205. The instructions, code sequences, configuration information, or other data may be copied from the data storage 204, such as mass storage, or from the propagated data signal into a memory 202 and accessed and executed by processor 201.

In alternate embodiments, the present invention is implemented in discrete hardware or firmware. For example, one or more application specific integrated circuits (ASICs) could be programmed with some or all of the above-described functions of the present invention.

Turning now to FIGS. 6-9, the particular methods of the invention are described in terms of computer software with reference to a series of flowcharts. The methods to be performed by a processor on a router or other network device constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic such as an application-specific integrated circuit (ASIC). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 6:
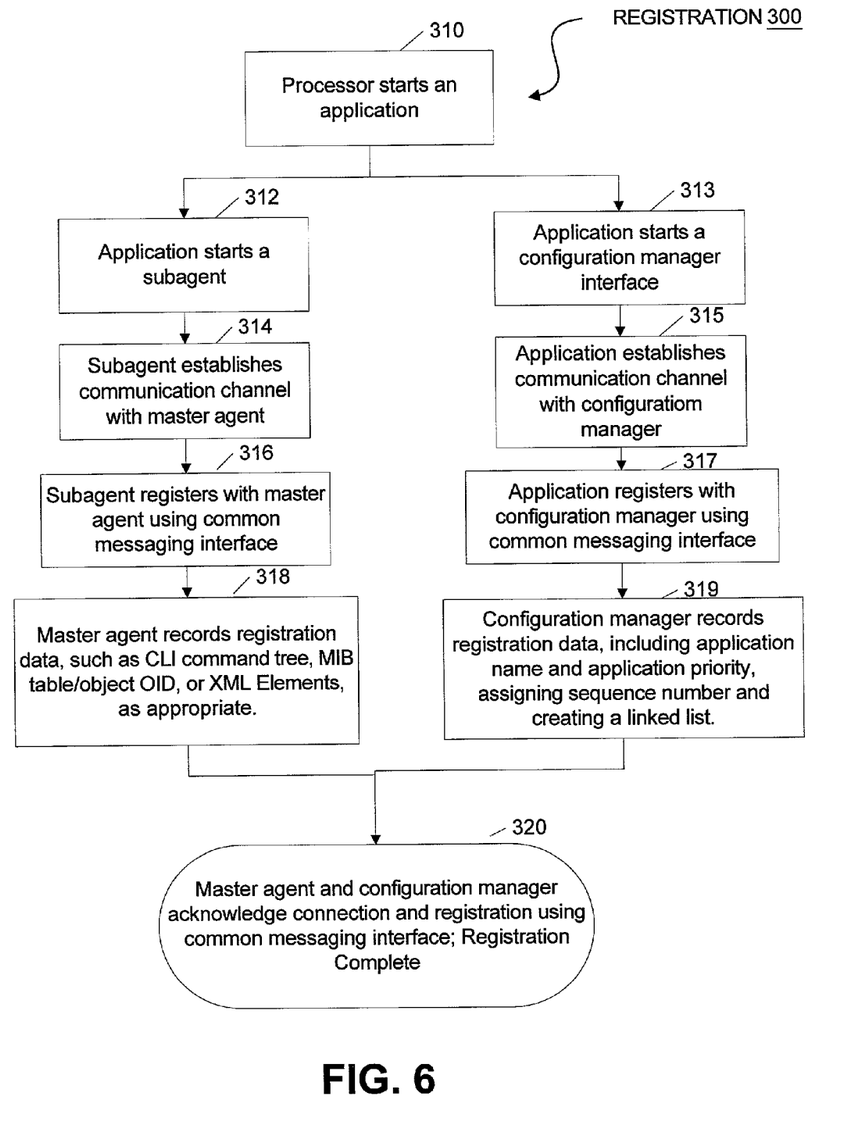
FIG. 6 is a flow diagram illustrating certain aspects of a method to be performed by a computer executing one embodiment of the illustrated invention shown in FIGS. 1-5.

FIG. 6 is a flowchart illustrating certain aspects of a method to be performed by a computer executing one embodiment of the illustrated invention shown in FIGS. 1-5. In one embodiment, during the registration process 300, at processing block 310, a process manager on a router or other network device, starts an application such as a BGP application 45, whereupon the application 45, at processing block 313 starts a configuration manager interface 47 and proceeds at processing block 315 to establish a communication channel 71 with the configuration manager 70. Processing continues at block 317 where the application 45 registers with the configuration manager 70 using common messaging interface 110 to provide the application name, priority and other application-specific information. In one embodiment, the application 45 registers by sending two messages formatted in accordance with the common messaging interface 110 where the message tag 132 on one of the messages is REGISTER_CM_APP_NAME, and on the other message is REGISTER_CM_APP_PRIORITY. The first message contains in the message content 136 area the application name "BGP," or some representation thereof. The second message contains in the message content 136 area a value that indicates the priority of the BGP application 45 relative to other applications in the router. In one embodiment, at processing block 319, the configuration manager 70 records the application name and priority value and assigns a sequence number to the application 45 based on the priority and links all of the registered applications 45/55/65 to form a link-list based on the sequence number. In this way the configuration manager 70 is able to perform the saves of the configuration data from multiple applications 45/55/65 in a preferred application order, i.e. to update the configuration data so as to reflect the various protocol dependencies that may exist in a given router or network device.

In one embodiment, at processing block 312, the application starts a subagent, say the CLI subagent 42, whereupon the subagent 42, at processing block 314, establishes a communications channel 25 with the CLI master agent 20, and at processing block 316, registers with the CLI master agent 20. At processing block 318, the master agent 20 records the registration information, which, in the case of the CLI management interface is a CLI command tree. Other registration information may be applicable, such as an SNMP MIB table/object OID, or an XML element the respective SNMP or XML management interfaces. For example, in the SNMP context, the subagent 41 registers leaves into the SNMP master agent's 10 MIB tree, whereas in the CLI context, the subagent 42 registers leaves into the CLI master agent's 20 CLI command tree. It is this registration information that enables the master agents 10/20/30 to properly identify and validate the various configuration commands and data that they receive. At processing block 320, registration is completed when the CLI master agent 20 and configuration manager 70 acknowledge their respective registrations and established connections, i.e. communication channels 15/25/35.

The configuration manager 70 and CLI master agent 20 are now capable of commencing "listening" to the BGP application's configuration manager interface 47 and CLI subagent 42 respectively, and using them in order to process configuration information passed using the CLI management interface to the BGP application 45.

It should be noted that in the above description, only the BGP application 45 and CLI management interface were described in detail for convenience—of course, the same description applies to the SNMP and XML interfaces or the OSPF or Ethernet Interface applications 55/65, or any other management interface or application that is capable of operating on a router or other network device.

Figure 7:
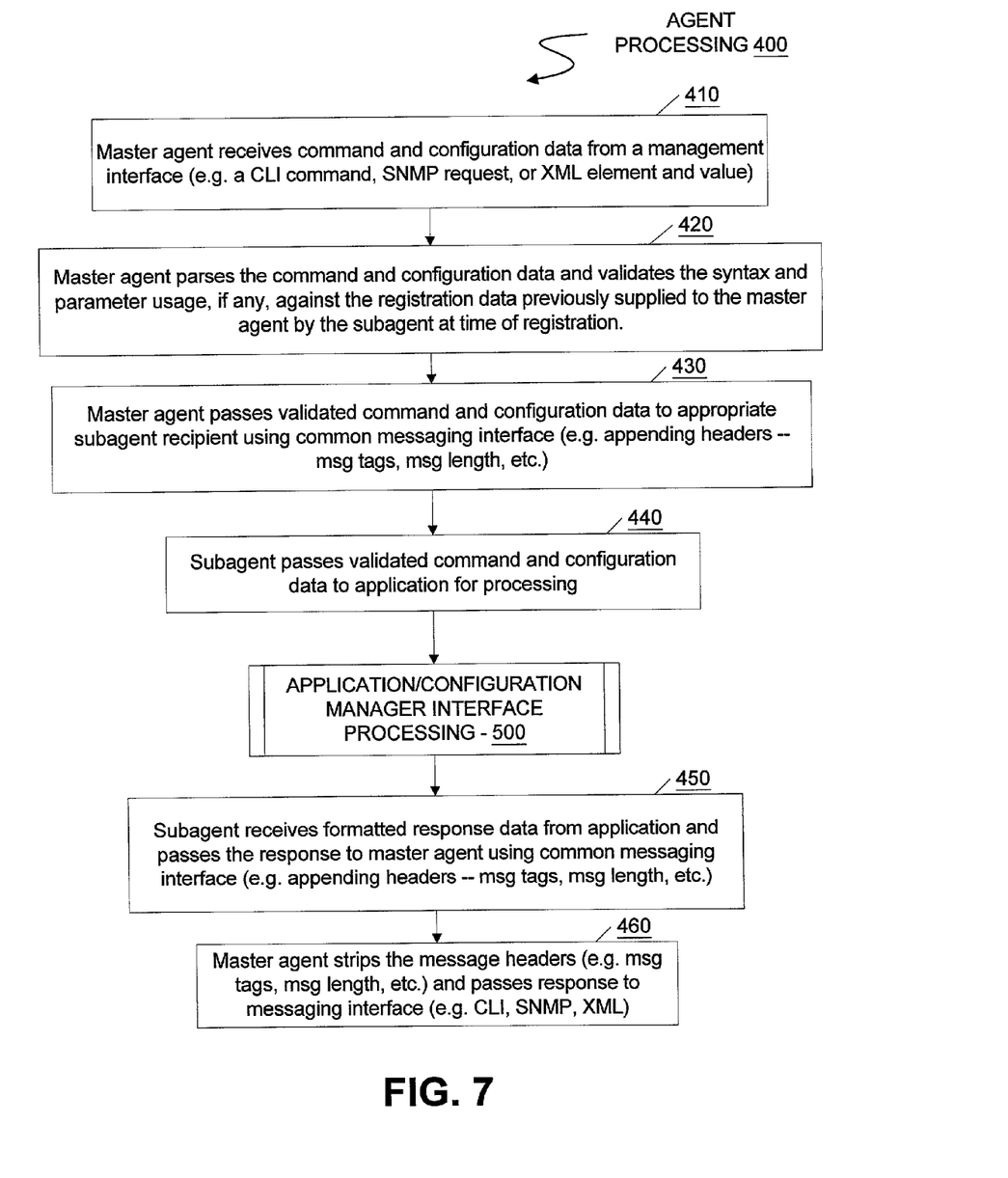
FIG. 7 is a flow diagram illustrating certain other aspects of a method to be performed by a computer executing one embodiment of the illustrated invention shown in FIGS. 1-5.

FIG. 7 is a flowchart illustrating the agent processing 400 between the master agents 10/20/30 and the subagents 42/52/62 in further detail. The master agents 10/20/30 act as a traffic controller and arbiter of all of a given management interface's functionality for an application or other component of a network device. Again, using the CLI management interface and BGP application 45 as an example, at processing block 410, the CLI master agent 20 processes an incoming CLI command and associated configuration data including validating the command and data in accordance with the registration data. The registration data includes, in this case, a CLI command tree. However, other registration data may be employed without departing from the scope of the invention, depending on the management interface, such as SNMP management information bases (MIBs), and XML tags or supported elements, or any other data that enables the master agent to identify and validate the incoming management command and configuration data and direct it to the appropriate application.

In one embodiment, at processing block 410, the master agent 20 parses the command and associated configuration data (e.g. the parameters to the CLI command), and validates the syntax and CLI command parameter usage, if any, against the registration data previously supplied to the master agent 20 by the subagent 42 at the time of registration. At processing block 430, the master agent 20 passes the validated command and configuration data to the appropriate subagent, in this case the CLI subagent 42 for the BGP application 45. The master agent 20 uses the common messaging interface 110 to pass the command and configuration data to the subagent 42 over communication channel 25, appending the appropriate header information, including a message tag 132 value of "CLI_CMD" to identify the message content 136, and a message length 134, which includes the length of the message tag 132, the message content 136 and the message length 134 itself.

Figure 8:
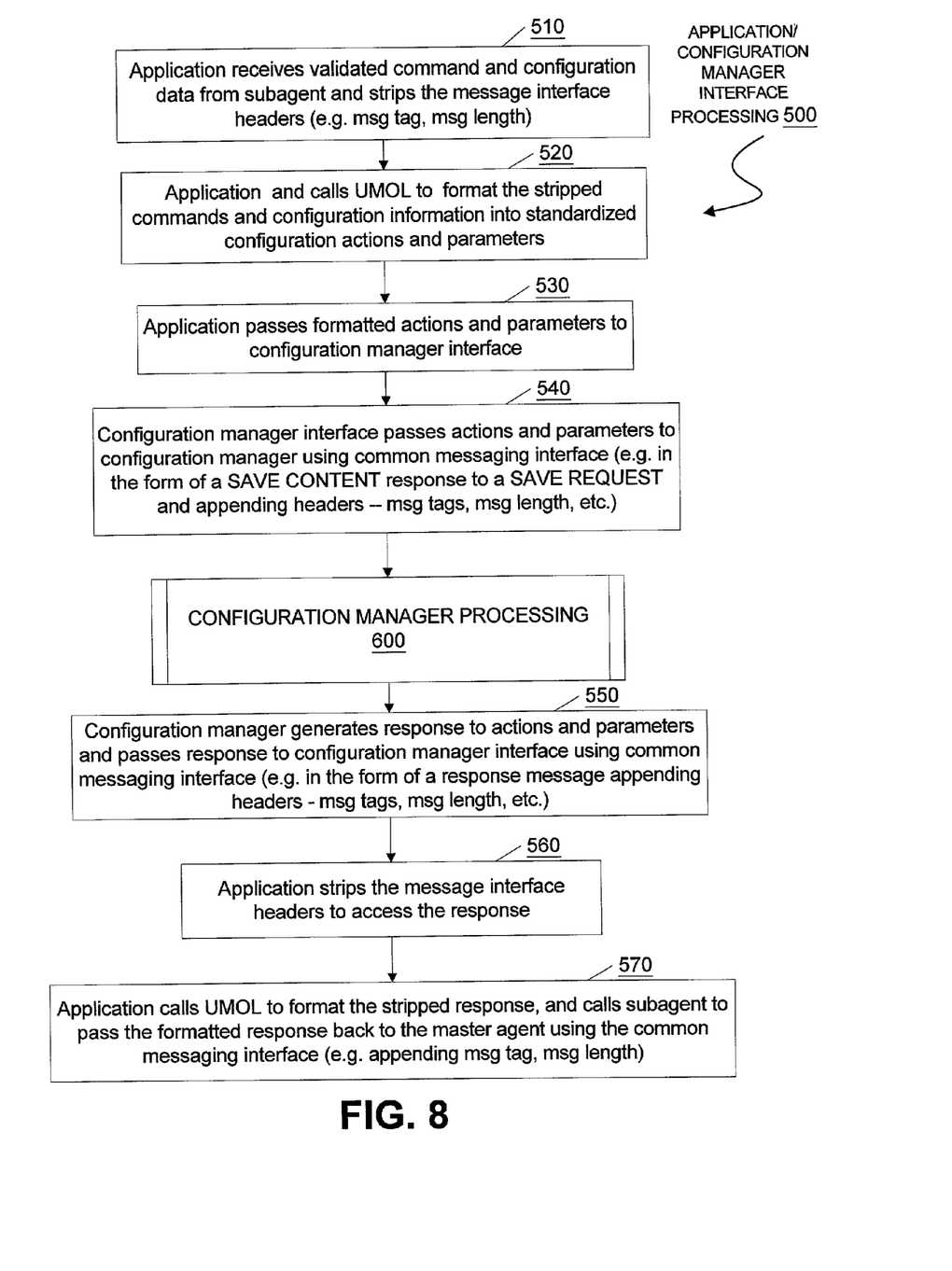
FIG. 8 is a flow diagram illustrating certain other aspects of a method to be performed by a computer executing one embodiment of the illustrated invention shown in FIGS. 1-5.

In one embodiment, at processing block 440, the CLI subagent 42 for BGP application 45 receives from the CLI master agent 20 the command and configuration data in the messaging interface 110, and passes it on to the BGP application 45 for processing at pre-defined process 500, described in further detail in FIG. 8. If applicable, at processing block 450, the CLI subagent 42 receives formatted response data from the application 45 and passes the response to the CLI master agent 20, also using the common messaging interface 110, inserting the response into the message content 136 and appending the appropriate message tag 132 and message length 134 or whatever other headers may be required to send the message across communication channel 25. At processing block 460, the master agent completes the processing of any response by the application 45, by stripping the message headers—the message tag 132 and message length 134—and passing the response back to the appropriate management interface, in this case the CLI management interface.

FIG. 8 is a flowchart illustrating the application/configuration manager interface processing 500 between the applications 45/55/65 and the configuration manager interfaces 47/57/67 in further detail. Since all updates to the router's configuration are managed by the configuration manager 70, the configuration manager interfaces 47/57/67 act as a traffic controller and arbiter of all of a given application's functionality vis a vis the configuration. In other words, all of the updates or accesses to the configuration that a given application might need are handled through each application's configuration manager interfaces 47/57/67 Again, using the CLI management interface and BGP application 45 as an example, at processing block 510, the application for the BGP protocol 45 receives validated command and configuration data from the CLI subagent 42 and strips the message interface headers—message tag and message length. At processing block 520, the application 42 calls the UMOL 44 to format the stripped CLI commands and configuration information into an internal data structure 74. In one embodiment, the UMOL internal data structure 74 takes the form of actions and parameters. At processing block 530, the application 42 passes the formatted actions and parameters to the configuration manager interface 47. At processing block 540, the configuration manager interface 47 passes the actions and parameters to the configuration manager 70 in response to periodic SAVE requests issued by the configuration manager using the common messaging interface 110, i.e. in the form of messages having a message TAG of "SAVE_REQUEST," and sent over communication channel 71. The responses that are passed take the form of messages having a message TAG of "SAVE_CONTENT" to indicate that the message content 136 of the message according to the common messaging interface 110 is composed of the actions and parameters generated by the application 42 and the universal management object layer 44. After processing by the configuration manager 600 as described in FIG. 9, the processing continues at processing block 560, where the application 42 strips the message interface headers so that it can access the response, if any, contained in the message content 136. If the response is destined for the user, the application calls the UMOL 44 to format the stripped response, and calls the subagent 42 to pass the formatted response back to the master agent using the common messaging interface 110 and communications channel 25 (e.g. by appending msg tag, msg length, etc.).

Figure 9:
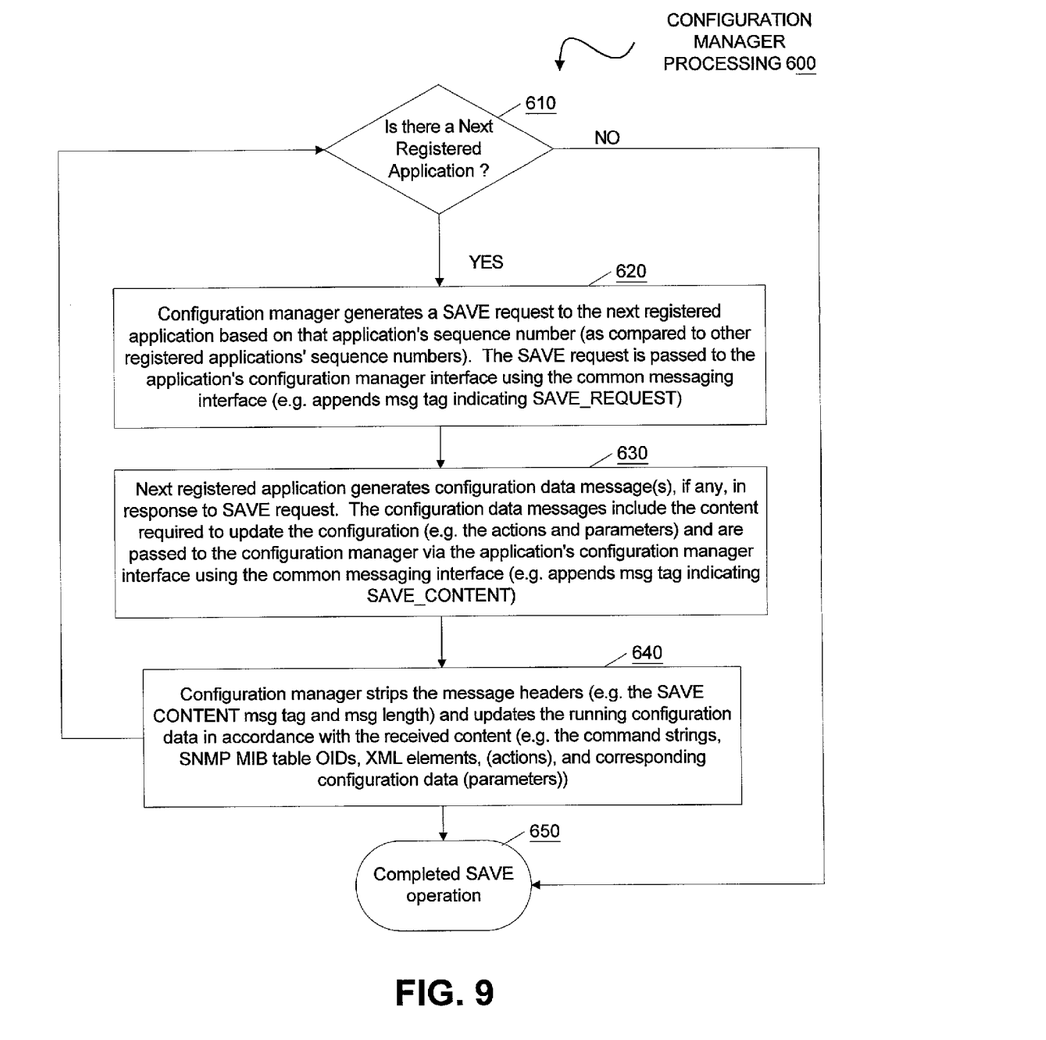
FIG. 9 is a flow diagram illustrating certain other aspects of a method to be performed by a computer executing one embodiment of the illustrated invention shown in FIGS. 1-5.

FIG. 9 is a flowchart illustrating the configuration manager processing 600. Since the knowledge of the detailed command syntax, command execution order, validation and other knowledge necessary to process the command and configuration data received from the master agent/subagent scheme resides in the application layer 40/50/60, the actual updates to the configuration resulting from that knowledge can be reduced to a limited set of actions and parameters that are applied by the configuration manager 70 via the configuration manager interface 47/57/67. Thus, the configuration manager 70 functions as a "dumb" layer between the applications 45/55/65 and the actual router configuration.

In one embodiment, at processing block 610, the configuration manager 70 first determines whether there are any registered applications 45/55/65 that might have configuration data that needs to be saved. Recall that each application registered with the configuration manager 70 via the common messaging interface 110 at startup time. If there are no actively registered applications, then the configuration manager processing terminates 650. If there are registered applications, the at processing block 620, the configuration manager 70 generates a SAVE_REQUEST message for the next registered application. The next registered application is determined based on that application's sequence number as compared to other registered applications' sequence numbers. Recall the applications sequence numbers were generated at the time of the registration. The application sequence numbers enable the configuration manager to preserve the necessary configuration update priority. The configuration update priority depends on the type of application that is being supported.

In one embodiment, the SAVE_REQUEST message is formatted in accordance with the common messaging interface 110 with appropriate message TAG 132 and message length 134 values, and sent over communication channel 71 between the configuration manager 70 and the configuration manager interface 47. At processing block 630, the next registered application generates a SAVE_CONTENT in accordance with the common messaging interface 110. The SAVE_CONTENT message content 136 includes the content required to update the router's last saved configuration. In one embodiment, the content is in the form of the actions and parameters generated in accordance with the application's UMOL 44. The content is in the same form, i.e. the actions and parameters, regardless of the management interface, CLI, SNMP, or XML, from which the content originated, whether it was an SNMP MIB table OIDs, XML elements or CLI commands.

At processing block 640, the configuration manager 70 strips the message headers from the SAVE-CONTENT message—the message TAG 132 and message length 134—and updates the last saved configuration data in accordance with the message content 136. The configuration manager processing 600 resumes at processing block 610 until there are no more actively registered applications from which to receive configuration updates.

Accordingly, a novel method and apparatus is described in which a configuration management system 100 facilitates the dynamic management of a configuration on a network device. From the foregoing description, those skilled in the art will recognize that many other variations of the present invention are possible. In particular, while the present invention has been described as being implemented in a network comprising a master agent, subagent, application, configuration manager and related components, it should be noted that some of the logic described herein may be distributed in other components of a network device without departing from the scope of the present invention.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for the common messaging interface 110, the master agents 10/20/30, the subagents 42/52/62, the applications 44/54/64, the configuration manager 70, and related components can be stored on the machine-accessible medium. In addition, the registration data that the applications use to register with the master agent and the configuration manager respectively, or the configuration commands, requests, actions, and parameters and associated other data may be stored in an internal storage area or on an external storage medium that is machine-accessible. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A method of managing the configuration of a network device, comprising:
   registering a device configuration application having a priority with a device configuration master agent and a device configuration manager, wherein the configuration application, the master agent, and the configuration manager operate independently of each other and wherein failure of one of the configuration application, the master agent and the configuration manager does not result in a single point of failure for the network device;
   validating received data in the master agent;
   passing the validated data to the application, the application converting the validated data to an internal data structure comprises formatting the validated data into at least one of an action and a parameter; and
   periodically requesting that a content of the internal data structure be passed to the configuration manager, the configuration manager updating a configuration in accordance with the application priority.

2. A method of claim 1, wherein the master agent represents a Simple Network Management Protocol (SNMP) management interface and wherein registering an application comprises recording a new leaf into an SNMP management information base (MIB) tree.

3. A method of claim 1, wherein the master agent represents a command line interface (CLI) management interface and registering an application comprises recording a new leaf into a CLI command tree.

4. A method of claim 1, wherein the master agent represents an Extensible Markup Language (XML) management interface and registering an application comprises recording a new tag into an XML format file.

5. A method of claim 1, wherein validating the received data comprises comparing the received data against the master agent's registration information.

6. A method of claim 1, wherein the action and the parameter conform to a common format regardless of an origin of the received data.

7. A method of claim 6, wherein the origin of the received data is a CLI command.

8. A method of claim 6, wherein the origin of the received data is a SNMP request.

9. A method of claim 6, wherein the origin of the received data is a XML request.

10. A article of manufacture comprising:
    a non-transitory machine-accessible medium including a data that, when accessed by a machine cause the machine to,
    register a device configuration application having a priority with a device configuration master agent and a device configuration manager, wherein the configuration application, the master agent, and the configuration manager operate independently of each other and wherein failure of one of the configuration application, the master agent and the configuration manager does not result in a single point of failure for the network device;
    validate received data in the master agent;
    pass the validated data to the application, the application converting the validated data to an internal data structure comprises formatting the validated data into at least one of an action and a parameter; and
    periodically request that a content of the internal data structure be passed to the configuration manager, the configuration manager updating a configuration in accordance with the application priority.

11. The article of manufacture of claim 10, wherein the data that causes the machine to register an application includes recording a new leaf into an Simple Network Management Protocol (SNMP) management information base (MIB) tree, wherein the master agent is an SNMP management interface.

12. The article of manufacture of claim 10, wherein the data that causes the machine to register an application includes recording a new leaf into a command line interface (CLI) command tree, wherein the master agent is a CLI management interface.

13. The article of manufacture of claim 10, wherein that data that causes the machine to register an application includes recording a new tag into an Extensible Markup Language (XML) format file, wherein the master agent is an XML management interface.

14. The article of manufacture of claim 10, wherein the data that causes the machine to validate comprises comparing the received data against the master agent's registration information.

15. The article of manufacture of claim 10, wherein the action and the parameter conform to a common format regardless of an origin of the received data.

16. The article of manufacture of claim 15, wherein the origin of the received data is a CLI command.

17. The article of manufacture of claim 15, wherein the origin of the received data is a SNMP request.

18. The article of manufacture of claim 15, wherein the origin of the received data is a XML request.

* * * * *